United States Patent
Daniel et al.

(10) Patent No.: US 9,833,769 B2
(45) Date of Patent: Dec. 5, 2017

(54) PROCESS FOR PRODUCING WATER-ABSORBING POLYMER PARTICLES WITH HIGH FREE SWELL RATE

(75) Inventors: Thomas Daniel, Waldsee (DE); Volker Braig, Weinheim-Lützelsachsen (DE); Asif Karim, Mannheim (DE)

(73) Assignee: BASF SE, Ludwigshafen (DE)

( * ) Notice: Subject to any disclaimer, the term of this patent is extended or adjusted under 35 U.S.C. 154(b) by 1278 days.

(21) Appl. No.: 13/365,807

(22) Filed: Feb. 3, 2012

(65) Prior Publication Data

US 2012/0211699 A1    Aug. 23, 2012

Related U.S. Application Data

(60) Provisional application No. 61/439,961, filed on Feb. 7, 2011.

(51) Int. Cl.

| | | |
|---|---|---|
| C08F 20/10 | (2006.01) | |
| C09K 3/00 | (2006.01) | |
| B01J 20/26 | (2006.01) | |
| B29C 49/00 | (2006.01) | |
| B01J 20/30 | (2006.01) | |
| B01J 20/28 | (2006.01) | |

(52) U.S. Cl.
CPC ......... *B01J 20/3021* (2013.01); *B01J 20/264* (2013.01); *B01J 20/267* (2013.01); *B01J 20/28004* (2013.01); *B01J 20/28047* (2013.01); *B01J 20/3078* (2013.01); *B01J 20/3085* (2013.01); *B01J 2220/68* (2013.01)

(58) Field of Classification Search
CPC .... B01J 20/264; B01J 20/267; B01J 20/3021; B01J 20/28047; B01J 20/3085; B01J 20/28004; B01J 20/3078; B01J 2220/68

USPC .......... 526/318; 502/402; 425/522; 252/194
See application file for complete search history.

(56) References Cited

U.S. PATENT DOCUMENTS

| | | | |
|---|---|---|---|
| 5,369,148 A | 11/1994 | Takahashi et al. | |
| 5,672,633 A | 9/1997 | Brehm et al. | |
| 6,323,252 B1 * | 11/2001 | Gartner et al. | ............... 521/149 |
| 6,414,214 B1 | 7/2002 | Engelhardt et al. | |
| 7,179,851 B2 | 2/2007 | Qin | |
| 2005/0031850 A1 | 2/2005 | Mitchell et al. | |
| 2005/0137546 A1 | 6/2005 | Joy et al. | |
| 2006/0057389 A1 | 3/2006 | Reimann et al. | |
| 2007/0293632 A1 * | 12/2007 | Riegel et al. | ............. 525/329.9 |

(Continued)

FOREIGN PATENT DOCUMENTS

| | | |
|---|---|---|
| CA | 2433044 A1 | 7/2002 |
| EP | 0 480 031 A1 | 4/1992 |

(Continued)

OTHER PUBLICATIONS

International Search Report in international application No. PCT/EP2012/052022, dated May 14, 2012 (English translation).

(Continued)

*Primary Examiner* — Jane L Stanley
(74) *Attorney, Agent, or Firm* — Marshall, Gerstein & Borun LLP

(57) ABSTRACT

The invention relates to a process for producing water-absorbing polymer particles with high free swell rate, comprising the steps of polymerization, drying, grinding, classification and thermal surface postcrosslinking, remoisturization and drying again.

14 Claims, 2 Drawing Sheets

(56) References Cited

U.S. PATENT DOCUMENTS

| | | | |
|---|---|---|---|
| 2008/0032888 A1 | 2/2008 | Nakamura et al. | |
| 2008/0200331 A1* | 8/2008 | Daniel | A61L 15/60 502/402 |
| 2009/0008604 A1* | 1/2009 | Nakashima et al. | 252/194 |
| 2010/0041550 A1* | 2/2010 | Riegel et al. | 502/402 |
| 2010/0100066 A1 | 4/2010 | Azad et al. | |
| 2011/0204288 A1* | 8/2011 | Funk | A61L 15/60 252/194 |
| 2012/0085971 A1* | 4/2012 | Daniel | A61L 15/60 252/194 |
| 2013/0310250 A1* | 11/2013 | Belack | A61L 15/60 502/402 |

FOREIGN PATENT DOCUMENTS

| | | |
|---|---|---|
| EP | 0 780 424 A1 | 6/1997 |
| EP | 1 461 473 A1 | 9/2004 |
| EP | 1 690 887 A1 | 8/2006 |
| JP | H09502221 A | 3/1997 |
| JP | 2004517173 A | 6/2004 |
| JP | 2004300425 A | 10/2004 |
| JP | 2005344103 A | 12/2005 |
| JP | 2006297373 A | 11/2006 |
| WO | WO-91/17200 A1 | 11/1991 |
| WO | WO-95/09014 A1 | 4/1995 |
| WO | WO-97/03114 A1 | 1/1997 |
| WO | WO-01/25290 A1 | 4/2001 |
| WO | WO-02/053199 A1 | 7/2002 |
| WO | WO-2004/037900 A1 | 5/2004 |
| WO | 2006109844 A1 | 10/2006 |
| WO | WO-2006/109844 A1 | 10/2006 |
| WO | WO 2008/092843 A1 * 8/2008 ............ C08F 220/06 |
| WO | WO-2011/040530 A1 | 4/2011 |

OTHER PUBLICATIONS

Buchholz, Fredric L., et al. *Modern Superabsorbent Polymer Technology*, "Solution Polymerization: Unit Operations and Their Effect on Product Quality." New York: John Wiley & Sons, Inc., 1998, pp. 71-103.

* cited by examiner

PROCESS FOR PRODUCING WATER-ABSORBING POLYMER PARTICLES WITH HIGH FREE SWELL RATE

CROSS-REFERENCE TO RELATED APPLICATIONS

This application claims the benefit of U.S. provisional Patent Application No. 61/439,961, filed Feb. 7, 2011, incorporated by reference herein in its entirety.

DESCRIPTION

The present invention relates to a process for producing water-absorbing polymer particles with high free swell rate, comprising the steps of polymerization, drying, grinding, classification and thermal surface postcrosslinking, remoisturization and drying again.

Water-absorbing polymer particles are used to produce diapers, tampons, sanitary napkins and other hygiene articles, but also as water-retaining agents in market gardening. The water-absorbing polymer particles are often also referred to as "absorbent resins", "superabsorbents", "superabsorbent polymers", "absorbent polymers", "absorbent gelling materials", "hydrophilic polymers" or "hydrogels".

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With increasing amount of crosslinker, the centrifuge retention capacity (CRC) falls and the absorption under a pressure of 21.0 g/cm$^2$ (AUL0.3 psi) passes through a maximum.

To improve the performance properties, for example, saline flow conductivity (SFC) and absorption under a pressure of 49.2 g/cm$^2$ (AUL0.7 psi), water-absorbing polymer particles are generally surface postcrosslinked. This increases the crosslinking of the particle surface, which can at least partly decouple the absorption under a pressure of 49.2 g/cm$^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker, thermally surface postcrosslinked and dried. Crosslinkers suitable for that purpose are compounds which can form covalent bonds to at least two carboxylate groups of the water-absorbing polymer particles.

The remoisturization of surface postcrosslinked polymer particles is described, for example, in EP 0 480 031 A1, EP 0 780 424 A1, WO 01/025290 A1, WO 2004/037900 A1 and WO 2006/109844 A1.

EP 0 780 424 A1 teaches that the residual epoxide content after surface postcrosslinking with epoxides can be lowered by addition of a nucleophile such as water.

WO 01/025290 A1 describes remoisturization to increase the mechanical stability of the water-absorbing polymer particles.

WO 2004/037900 A1 discloses a two-stage mixing process for remoisturization.

EP 0 480 031 A1 and WO 2006/109844 A1 teach the use of water for agglomeration of water-absorbing particles.

It was an object of the present invention to provide a process for producing water-absorbing polymer particles with improved free swell rate.

The object was achieved by a process for producing water-absorbing polymer particles by polymerizing a monomer solution or suspension comprising a) at least one ethylenically unsaturated monomer which bears acid groups and may be at least partly neutralized, b) at least one crosslinker, c) at least one initiator, d) optionally one or more ethylenically unsaturated monomers copolymerizable with the monomers mentioned under a) and e) optionally one or more water-soluble polymers, by drying, grinding and classifying the polymer gel, the polymer particles being classified to a particle size in the range from m to n μm, where m is in the range from 50 to 300 and n is in the range from 400 to 1200, coating the classified polymer particles with f) at least one surface postcrosslinker and g) optionally at least one polyvalent metal cation and thermally surface postcrosslinking them, wherein the moisture content of the water-absorbing polymer particles after the thermal surface postcrosslinking is increased by 1 to 150% by weight and the water-absorbing polymer particles are subsequently dried.

Figure 1:
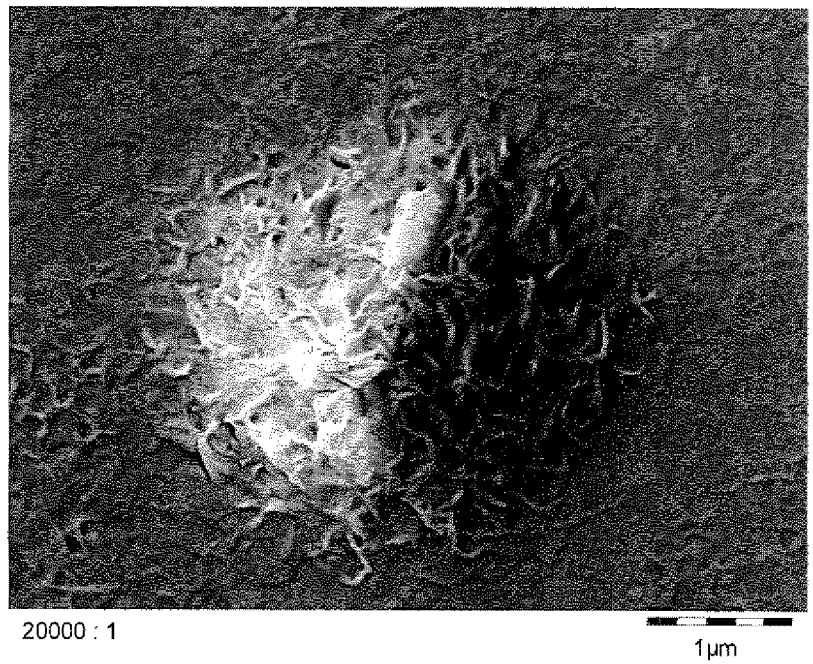
FIG. 1 is a photograph of a surface of a polymer particle without cracks.

The classification is carried out by means of suitable sieves with the appropriate mesh sizes, where m is in the range from preferably 80 to 250, more preferably from 100 to 200, most preferably from 110 to 150, and m is in the range from preferably 500 to 1000, more preferably from 600 to 900, most preferably from 700 to 850.

The moisture content after the thermal surface postcrosslinking is increased by preferably 2.5 to 100% by weight, more preferably 5 to 50% by weight, very particularly 10 to 25% by weight (remoisturization). The method by which the moisture content is increased is not subject to any restriction. For example, the water-absorbing polymer particles can be contacted with water in liquid or gaseous form, for example by spray application or by ventilation with moist gases (air, nitrogen, etc.). Alternatively, it is possible to mix in crushed ice or already moist water-absorbing polymer particles. Combinations of different addition forms are also possible.

The product temperature during the increase in the water content is, for example, 0 to 140° C., preferably 20 to 120° C., more preferably 50 to 100° C., most preferably 60 to 90° C.

The residence time between increase in the water content and subsequent drying is uncritical and is, for example, less than 10 days, preferably less than 5 days, more preferably less than one day, especially preferably less than 6 hours, most preferably less than 2 hours.

The subsequent drying can be performed statically or dynamically, which means that the water-absorbing polymer particles are moved, for example stirred, or are not. Preference is given to dynamic drying. The pressure in the course of drying is likewise uncritical and corresponds, for example, to ambient pressure or lower (reduced pressure). However, it is also possible to ventilate the water-absorbing polymer particles with a dry gas (air, nitrogen, etc.) for drying.

In a preferred embodiment of the present invention, the desired moisture content for the end product is established in the course of the inventive drying.

Subsequently, the water-absorbing polymer particles are dried at temperatures of preferably less than 150° C., more preferably less than 130° C., most preferably less than 110°, down to a moisture content of preferably less than 10% by weight, more preferably less than 7% by weight, most preferably less than 5% by weight.

The present invention is based on the finding that the free swell rate (FSR) of water-absorbing polymer particles can be increased by swelling the surface postcrosslinked polymer particles and drying them again. The swelling forms cracks in the relatively highly crosslinked shell. These cracks are possibly the cause of the increase in the free swell rate (FSR). However, the water-absorbing polymer particles must not swell too greatly since the polymer particles otherwise stick to one another. In addition, according to the present invention, the excessively small polymer particles are removed before the surface postcrosslinking, and so there is no need for agglomeration.

The surface postcrosslinked polymer particles usable for the process according to the invention therefore typically have a high saline flow conductivity (SFC) and a high vortex, for example a saline flow conductivity (SFC) of preferably at least $100 \times 10^{-7}$ cm$^3$ s/g, more preferably of at least $120 \times 10^{-7}$ cm$^3$ s/g, most preferably of 130 to $250 \times 10^{-7}$ cm$^3$ s/g, and a vortex of preferably at least 60 s, more preferably at least 80 s, most preferably of 100 to 500 s.

The surface postcrosslinked polymer particles usable for the process according to the invention have a centrifuge retention capacity (CRC) of typically at least 15 g/g, preferably at least 20 g/g, more preferably at least 22 g/g, especially preferably at least 24 g/g and most preferably 26 to 60 g/g. The centrifuge retention capacity (CRC) is determined by EDANA recommended test method No. WSP 241.2-05 "Fluid Retention Capacity in Saline, After Centrifugation".

The surface postcrosslinked polymer particles usable for the process according to the invention have an absorption under a pressure of 49.2 g/cm$^2$ of typically at least 15 g/g, preferably at least 20 g/g, more preferably at least 22 g/g, especially preferably at least 24 g/g and most preferably 26 to 35 g/g. The absorption under a pressure of 49.2 g/cm$^2$ is determined analogously to EDANA recommended test method No. WSP 242.2-05 "Absorption under Pressure, Gravimetric Determination", except that a pressure of 49.2 g/cm$^2$ is established instead of a pressure of 21.0 g/cm$^2$.

The production of the water-absorbing polymer particles is described in detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

The monomer solution or suspension is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The resulting polymer gel is dried. The driers are not subject to any restriction. However, the drying of the polymer gel is preferably performed with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

The dried polymer gel is ground and classified, and the apparatus used for grinding may typically be single or multistage roll mills, preferably two or three-stage roll mills, pin mills, hammer mills or vibratory mills.

The mean particle size of the polymer particles removed as the product fraction is preferably at least 200 μm, more preferably from 250 to 600 μm and very particularly from 300 to 500 μm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight, most preferably at least 98% by weight.

Polymer particles with too small a particle size lower the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of at most 600 μm is preferably at least 90% by weight, more preferably at least 95% by weight, most preferably at least 98% by weight.

Polymer particles with excessively large particle size lower the free swell rate. The proportion of excessively large polymer particles should therefore likewise be small.

Excessively large polymer particles are therefore typically removed and recycled into the grinding of the dried polymer gel.

To improve the properties, the polymer particles are thermally surface postcrosslinked. Suitable surface postcrosslinkers f) are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers f) are cyclic carbonates in DE 40 20 780 C1,2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers f) are ethylene carbonate, ethylene glycol diglycidyl ether, reaction products of polyamides with epichlorohydrin and mixtures of propylene glycol and 1,4-butanediol.

Very particularly preferred surface postcrosslinkers f) are 2-hydroxyethyloxazolidin-2-one, oxazolidin-2-one and 1,3-propanediol.

In addition, it is also possible to use surface postcrosslinkers f) which comprise additional polymerizable ethylenically unsaturated groups, as described in DE 37 13 601 A1.

The amount of surface postcrosslinker f) is preferably 0.001 to 2% by weight, more preferably 0.02 to 1% by weight and most preferably 0.05 to 0.2% by weight, based in each case on the polymer particles.

In a preferred embodiment of the present invention, polyvalent metal cations g) are applied to the particle surface in addition to the surface postcrosslinkers before, during or after the surface postcrosslinking.

The polyvalent metal cations g) usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred.

The amount of polyvalent metal cation g) used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker f) is sprayed onto the dried polymer particles. After the spray application, the polymer particles coated with surface postcrosslinker f) are dried thermally, and the surface postcrosslinking reaction can take place either before or during the drying.

The spray application of a solution of the surface postcrosslinker f) is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers f) are typically used in the form of an aqueous solution. The penetration depth of the surface postcrosslinker f) into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal surface postcrosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The thermal surface postcrosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface postcrosslinking temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized again after the inventive drying.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The present invention further provides the water-absorbing polymer particles obtainable by the process according to the invention.

The present invention further provides nonagglomerated water-absorbing polymer particles comprising i) at least one polymerized ethylenically unsaturated monomer a) which bears acid groups and may be at least partly neutralized, ii) at least one polymerized crosslinker b), iii) optionally one or more ethylenically unsaturated monomers d) copolymerized with the monomers mentioned under a) and iv) optionally one or more water-soluble polymers e), v) at least one reacted surface postcrosslinker f) and vi) optionally at least one polyvalent metal cation g), the water-absorbing polymer particles having a moisture content of less than 5% by weight and, under 20 000-fold magnification, having visible cracks in the particle surface.

Figure 2:
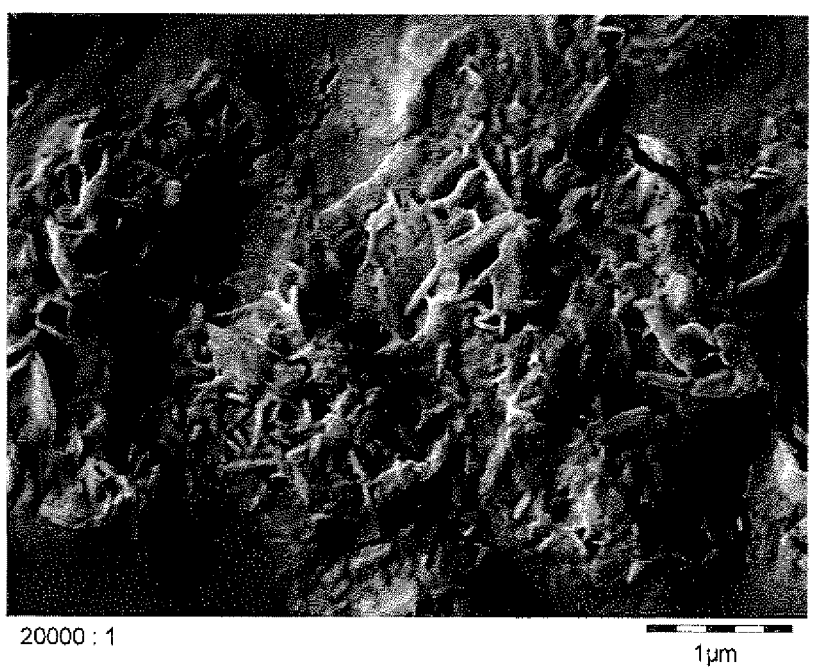
FIGS. 2-4 are photographs of surfaces of polymer particles with cracks.
Figure 3:
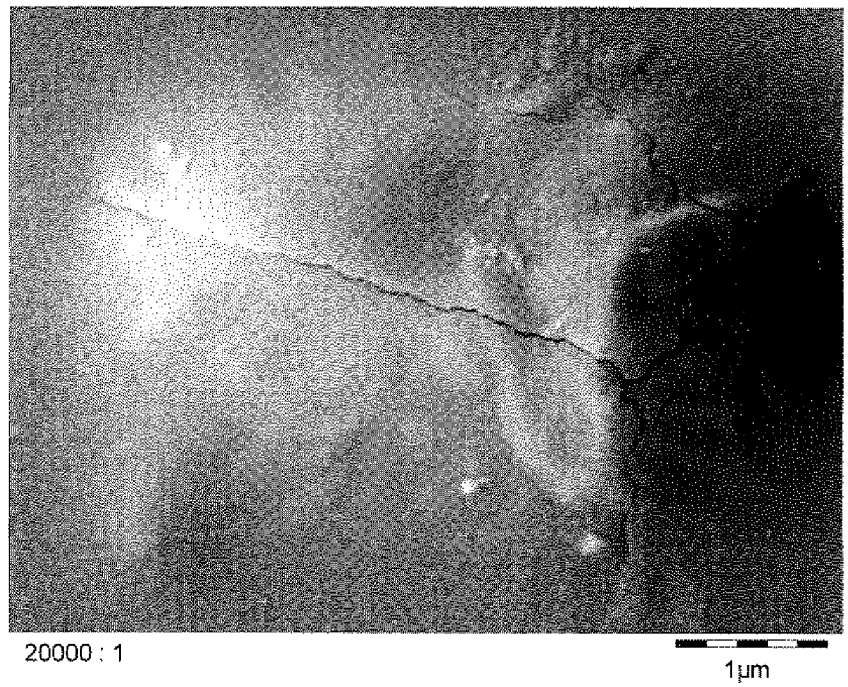
Figure 4:
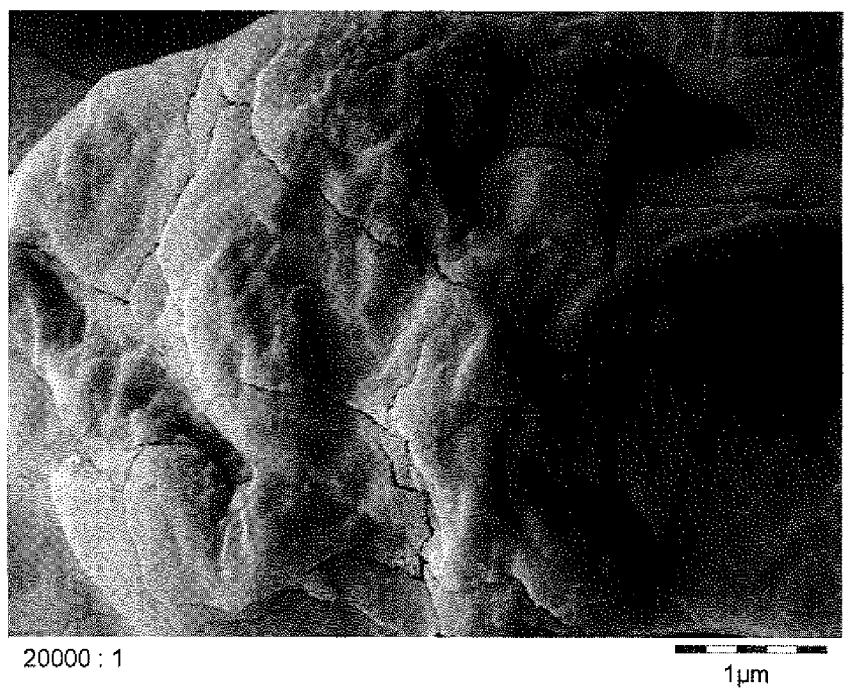

FIG. 1 shows the surface of a polymer particle without cracks and FIGS. 2 to 4 show surfaces of water-absorbing polymer particles with inventive cracks.

The polymerized monomer i) is preferably acrylic acid.

The inventive water-absorbing polymer particles typically have a high saline flow conductivity (SFC) and a low vortex, for example a saline flow conductivity (SFC) of preferably at least $100 \times 10^{-7}$ cm$^3$ s/g, more preferably of at least $120 \times 10^{-7}$ cm$^3$ s/g, most preferably of 130 to $250 \times 10^{-7}$ cm$^3$ s/g, and a vortex of preferably less than 100 s, more preferably of less than 80 s, most preferably of 20 to 60 s.

The inventive water-absorbing polymer particles have a centrifuge retention capacity (CRC) of typically at least 15 g/g, preferably at least 20 g/g, more preferably at least 22 g/g, especially preferably at least 24 g/g and most preferably 26 to 60 g/g. The centrifuge retention capacity (CRC) is determined by EDANA recommended test method No. WSP 241.2-05 "Fluid Retention Capacity in Saline, After Centrifugation".

The inventive water-absorbing polymer particles have an absorption under a pressure of 49.2 g/cm$^2$ of typically at least 15 g/g, preferably at least 20 g/g, more preferably at least 22 g/g, especially preferably at least 24 g/g and most preferably 26 to 35 g/g. The absorption under a pressure of 49.2 g/cm$^2$ is determined analogously to EDANA recommended test method No. WSP 242.2-05 "Absorption under Pressure, Gravimetric Determination", except that a pressure of 49.2 g/cm$^2$ is established instead of a pressure of 21.0 g/cm$^2$.

The present invention further provides hygiene articles comprising inventive water-absorbing polymer particles, especially hygiene articles for feminine hygiene, hygiene articles for light and heavy incontinence, or small animal litter.

The hygiene articles typically comprise a water-impervious backside, a water-pervious topside and an intermediate absorbent core composed of the inventive water-absorbing polymer particles and fibers, preferably cellulose. The proportion of the inventive water-absorbing polymer particles in the absorbent core is preferably 20 to 100% by weight and more preferably 50 to 100% by weight.

The water-absorbing polymer particles are tested by means of the test methods described below.

The standard test methods designated "WSP" are described in: "Standard Test Methods for the Nonwovens Industry", 2005 edition, published jointly by the Worldwide Strategic Partners EDANA (Avenue Eugène Plasky, 157, 1030 Brussels, Belgium, www.edana.org) and INDA (1100 Crescent Green, Cary, N.C. 27518, U.S.A., www.inda.org). This publication is available both from EDANA and from INDA.

METHODS

The measurements should, unless stated otherwise, be carried out at an ambient temperature of 23±2° C. and a relative air humidity of 50±10%. The water-absorbing polymer particles are mixed thoroughly before the measurement.
PH The pH of the water-absorbing polymer particles is determined by EDANA recommended test method No. WSP 200.2-02 "pH of Polyacrylate (PA) Powders".
Moisture Content The moisture content of the water-absorbing polymer particles is determined by EDANA recommended test method No. WSP 230.2-02 "Mass Loss Upon Heating".
Centrifuge Retention Capacity The centrifuge retention capacity (CRC) is determined by EDANA recommended test method No. WSP 241.2-05 "Fluid Retention Capacity in Saline, After Centrifugation".
Absorption Under a Pressure of 49.2 g/cm² (Absorption Under Load)

The absorption under a pressure of 49.2 g/cm² (AUL0.7 psi) is determined analogously to EDANA recommended test method No. WSP 242.2-05 "Absorption Under Pressure, Gravimetric Determination", except that a pressure of 49.2 g/cm² (AUL0.7 psi) is established instead of a pressure of 21.0 g/cm² (AUL0.3 psi).
Extractables The content of extractables of the water-absorbing polymer particles is determined according to EDANA recommended test method No. WSP 270.2-05 "Extractable".
Free Swell Rate To determine the free swell rate (FSR), 1.00 g (=W1) of the water-absorbing polymer particles is weighed into a 25 ml beaker and distributed homogeneously over its base. Then 20 ml of a 0.9% by weight sodium chloride solution are metered into a second beaker by means of a dispenser and the contents of this beaker are added rapidly to the first and a stopwatch is started. As soon as the last drop of salt solution has been absorbed, which is recognized by the disappearance of the reflection on the liquid surface, the stopwatch is stopped. The exact amount of liquid which has been poured out of the second beaker and absorbed by the polymer in the first beaker is determined accurately by reweighing the second beaker (=W2). The time interval required for the absorption, which has been measured with the stopwatch, is designated as t. The disappearance of the last liquid droplet on the surface is determined as the time t.

The free swell rate (FSR) is calculated therefrom as follows:

$$FSR[g/g\ s]=W2/(W1 \times t)$$

If the moisture content of the water-absorbing polymer particles, however, is more than 3% by weight, the weight W1 should be corrected to take account of this moisture content.

Vortex 50.0 ml±1.0 ml of a 0.9% by weight aqueous sodium chloride solution are introduced into a 100 ml beaker which comprises a magnetic stirrer bar of size 30 mm×6 mm. A magnetic stirrer is used to stir the sodium chloride solution at 600 rpm. Then 2.000 g±0.010 g of water-absorbing polymer particles are added as rapidly as possible, and the time taken for the stirrer vortex to disappear as a result of the absorption of the sodium chloride solution by the water-absorbing polymer particles is measured. When measuring this time, the entire contents of the beaker may still be rotating as a homogeneous gel mass, but the surface of the gelated sodium chloride solution must no longer exhibit any individual turbulences. The time taken is reported as the vortex.
Saline Flow Conductivity The saline flow conductivity (SFC) of a swollen gel layer under a pressure of 0.3 psi (2070 Pa) is, as described in EP 0 640 330 A1, determined as the gel layer permeability of a swollen gel layer of water-absorbing polymer particles, the apparatus described on page 19 and in FIG. 8 in the cited patent application having been modified such that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1. The flow is detected automatically.

The saline flow conductivity (SFC) is calculated as follows:

$$SFC[cm^3\ s/g]=(Fg(t=0) \times L0)/(d \times A \times WP)$$

where Fg(t=0) is the flow of NaCl solution in g/s, which is obtained using linear regression analysis of the Fg(t) data of the flow determinations by extrapolation to t=0, L0 is the thickness of the gel layer in cm, d is the density of the NaCl solution in g/cm³, A is the area of the gel layer in cm², and WP is the hydrostatic pressure over the gel layer in dyn/cm².

EXAMPLES

Example 1

A jacketed 10 l glass reactor with mechanical stirrer was initially charged with 4596 g of a 37.3% by weight sodium acrylate solution which had been filtered through activated carbon beforehand, and 596 g of water. While stirring and simultaneously cooling, 584 g of acrylic acid were metered in gradually. After bubbling nitrogen through for 30 minutes, 6.66 g of 3-tuply ethoxylated glyceryl triacrylate and 12.33 g of a 30% by weight solution of sodium persulfate in water were added and the mixture was stirred for a further minute. The reaction mixture was cooled at the same time such that the temperature at no time exceeded 35° C. and toward the end was approx. 20° C. The reaction mixture was subsequently transferred by means of a pump into an IKA® horizontal kneader of the HKS type (capacity 10 l) which had been preheated to 60° C. and was purged with nitrogen gas. Finally, while stirring in the horizontal kneader, 4.19 g of a 1% by weight solution of ascorbic acid in water and 0.44 g of 3% by weight hydrogen peroxide were added. The reactor jacket temperature was raised to 95° C. and, after 15 minutes of reaction time, the resulting polymer gel was removed from the horizontal kneader. The polymer gel thus obtained was distributed on metal sheets with wire mesh bases and dried at 165° C. for 90 minutes in a forced-air drying cabinet. This was followed by comminution with an ultracentrifuge mill and sieving of the product to 150 to 710 µm. The base polymer thus produced had a centrifuge retention capacity of 36.5 g/g.

1000 g of the base polymer were preheated to 50° C. in a drying cabinet and transferred into a Lödige® laboratory mixer. A solution consisting of 0.7 g of N-(2-hydroxyethyl)-2-oxazolidinone, 0.7 g of 1,3-propanediol, 14 g of propylene glycol, 19.8 g of isopropanol, 5.7 g of aluminum lactate, 0.08 g of sorbitan monolaurate and 16.9 g of water was sprayed onto the heated base polymer at a stirrer speed of 450 rpm and mixed at this speed for a further 2 minutes. Subsequently, the moist polymer particles were heated rapidly to a product temperature of 185° C. and mixed at a setting of 210 rpm for a further 60 minutes. The surface postcrosslinked polymer particles were cooled to ambient temperature and sieved to a particle size of 150 to 710 µm.

In each case 100 g of the surface postcrosslinked polymer particles were sieved to a particle size of 300 to 400 µm and introduced into a beaker. The beaker was stored in a desiccator. The desiccator was filled with water in the lower region. The water absorption of the surface postcrosslinked polymer particles was determined via the increase in weight. This was followed by drying at 105° C. in a forced-air drying cabinet and sieving again to a particle size of 300 to 400 µm.

The dried polymer particles were analyzed. The results are compiled in the table which follows.

TABLE 1

Influence of water absorption

| Water absorption [% by wt.] | CRC [g/g] | AUL0.7 psi [g/g] | SFC [$10^{-7}$ cm$^3$s/g] | Vortex [s] | FSR [g/gs] | Extr. [% by wt.] | pH | Drying time [min] |
|---|---|---|---|---|---|---|---|---|
| 0.0 | 26.3 | 23.6 | 133 | 103 | 0.19 | 8.3 | 5.92 | 0 |
| 4.9 | 25.7 | 23.4 | 135 | 91 | 0.21 | 8.0 | 5.91 | 30 |
| 10.1 | 25.9 | 23.4 | 131 | 84 | 0.23 | 8.1 | 5.91 | 30 |
| 15.8 | 26.1 | 23.2 | 137 | 64 | 0.27 | 7.6 | 5.91 | 100 |
| 20.6 | 25.8 | 23.2 | 130 | 61 | 0.29 | 8.7 | 5.91 | 100 |
| 33.0 | 25.6 | 23.2 | 145 | 57 | 0.31 | 7.9 | 5.90 | 120 |
| 40.0 | 25.5 | 23.2 | 140 | 57 | 0.31 | 7.9 | 5.91 | 140 |

The example shows that the free swell rate (FSR) can by enhanced by more than 50% by the process according to the invention.

Example 2

In each case 100 g of the surface postcrosslinked polymer particles with a particle size of 150 to 710 µm from example 1 were stored in a climate-controlled cabinet at 90° C. and a relative humidity of 75% for 90 minutes. The water absorptions were 7.6% by weight, 7.5% by weight and 8.3% by weight. Subsequently, the three samples were introduced into a 500 ml plastic bottle and homogenized by means of a tubular mixer for 10 minutes.

Example 2a

After three days, 45 g of the surface postcrosslinked polymer particles from example 2 were distributed homogeneously on a Petri dish and dried in a forced air drying cabinet at 105° C. for 3 hours. This was followed by sieving off to a particle size of less than 850 µm.

The dried polymer particles were analyzed. The results are summarized in table 2.

Example 2b

After two hours, 100 g of the surface postcrosslinked polymer particles from example 2 were introduced into a round-bottom flask with baffles and dried on a rotary evaporator at 80° C. under reduced pressure (250 to 350 mbar) for 20 minutes. This was followed by sieving off to a particle size of less than 850 µm.

The dried polymer particles were analyzed. The results are summarized in table 2.

Example 2c

After two hours, 100 g of the surface postcrosslinked polymer particles from example 2 were introduced into a round-bottom flask with baffles and dried on a rotary evaporator at 80° C. under reduced pressure (27 to 35 mbar) for 10 minutes. This was followed by sieving off to a particle size of less than 850 µm.

The dried polymer particles were analyzed. The results are summarized in table 2.

TABLE 2

Influence of drying

| Example | CRC [g/g] | AUL0.7 psi [g/g] | Vortex [s] |
|---|---|---|---|
| 2a | 27.3 | 24.1 | 68 |
| 2b | 25.2 | 24.2 | 65 |
| 2c | 25.7 | 24.1 | 67 |

The invention claimed is:

1. A process for producing water-absorbing polymer particles with high free swell rate by
    (i) polymerizing a monomer solution or suspension comprising
        a) at least one ethylenically unsaturated monomer which bears an acid group and may be at least partly neutralized,
        b) at least one crosslinker,
        c) at least one initiator,
        d) optionally one or more ethylenically unsaturated monomer copolymerizable with the monomer mentioned under a), and
        e) optionally one or more water-soluble polymer to form a polymer gel, (ii) drying, grinding, and classifying the polymer gel of step (i), the polymer particles being classified to a particle size in a range from m to n pm, wherein m is in a range from 50 to 300 and n is in a range from 400 to 1200;
(iii) coating the classified polymer particles with
   f) at least one surface postcrosslinker, and
   g) optionally at least one polyvalent metal cation;
(iv) thermally surface postcrosslinking the coated classified particles of step (iii);
(v) cooling the surface postcrosslinked particles of step (iv);
(vi) adding sufficient gaseous water to the cooled postcrosslinked particles of step (v) to increase the moisture content of the postcrosslinked particles by 1 to 150% by weight;
(vii) then drying the cooled postcrosslinked particles of step (vi) by heating the postcrosslinked particles at a sufficient temperature of less than 150° C. to form visible cracks in the particle surface under 20,000-fold magnification.

2. The process according to claim 1, wherein the moisture content of the water-absorbing polymer particles after the thermal postcrosslinking is increased by 10 to 25% by weight.

3. The process according to claim 1, wherein the water-absorbing polymer particles after increasing the moisture content are dried at a temperature of less than 130° C.

4. The process according to claim 1, wherein the water-absorbing polymer particles after increasing the moisture content are dried down to a moisture content of less than 10% by weight.

5. The process according to claim 1, wherein the dried, ground, and classified polymer gel is coated with 0.05 to 0.2% by weight of the surface postcrosslinker f).

6. The process according to claim 1, wherein the dried, ground, and classified polymer gel is coated with 0.02 to 0.8% by weight of the polyvalent metal cation g).

7. The process according to claim 1, wherein the water-absorbing polymer particles before increasing the moisture content have a saline flow conductivity of at least $100 \times 10^{-7}$ cm$^3$s/g and a vortex of at least 60 s.

8. The process according to claim 1, wherein the water-absorbing polymer particles before increasing the moisture content have a centrifuge retention capacity of at least 15 g/g.

9. The process according to claim 1, wherein the monomer a) is acrylic acid.

10. A hygiene article comprising water-absorbing polymer particles prepared according to claim 1.

11. The process according to claim 1, wherein the water-absorbing particles after increasing the moisture content in step (vii) are dried by heating at a temperature of 80° C. to less than 150° C.

12. Water-absorbing polymer particles obtainable by a process according to claim 1.

13. Polymer particles according to claim 12, wherein the polymerized monomer i) is polymerized acrylic acid.

14. A hygiene article comprising water-absorbing polymer particles according claim 12.

* * * * *

UNITED STATES PATENT AND TRADEMARK OFFICE
CERTIFICATE OF CORRECTION

PATENT NO. : 9,833,769 B2
APPLICATION NO. : 13/365807
DATED : December 5, 2017
INVENTOR(S) : Thomas Daniel et al.

It is certified that error appears in the above-identified patent and that said Letters Patent is hereby corrected as shown below:

In the Claims

At Column 15, Line 3, "pm," should be -- µm, --.

Signed and Sealed this
Nineteenth Day of June, 2018

Andrei Iancu
*Director of the United States Patent and Trademark Office*